United States Patent
Sohn et al.

(10) Patent No.: US 10,435,571 B2
(45) Date of Patent: Oct. 8, 2019

(54) METHOD FOR PREPARING CARBON NANOTUBE, AND DISPERSION COMPOSITION OF CARBON NANOTUBE

(71) Applicant: LG Chem, Ltd., Seoul (KR)

(72) Inventors: Kwon Nam Sohn, Daejeon (KR); Kil Sun Lee, Daejeon (KR); Won Jong Kwon, Daejeon (KR); Su Jin Park, Daejeon (KR); Byung Hun Oh, Daejeon (KR); Eui Yong Hwang, Daejeon (KR); Seung Bo Yang, Daejeon (KR); Kwang Hyun Yoo, Daejeon (KR); Mi Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 133 days.

(21) Appl. No.: 15/305,242

(22) PCT Filed: May 15, 2015

(86) PCT No.: PCT/KR2015/004903
§ 371 (c)(1),
(2) Date: Oct. 19, 2016

(87) PCT Pub. No.: WO2015/178631
PCT Pub. Date: Nov. 26, 2015

(65) Prior Publication Data
US 2017/0036914 A1    Feb. 9, 2017

(30) Foreign Application Priority Data

May 22, 2014  (KR) .................. 10-2014-0061880
May 14, 2015  (KR) .................. 10-2015-0067343

(51) Int. Cl.
| | |
|---|---|
| *C01B 32/158* | (2017.01) |
| *C01B 32/159* | (2017.01) |
| *B82Y 40/00* | (2011.01) |
| *B82Y 30/00* | (2011.01) |
| *C09D 7/65* | (2018.01) |
| *C09K 5/14* | (2006.01) |
| *C09D 5/24* | (2006.01) |
| *C09D 11/52* | (2014.01) |
| *H01B 1/24* | (2006.01) |
| *H01M 4/62* | (2006.01) |
| *C01B 32/174* | (2017.01) |
| *C01B 32/176* | (2017.01) |
| *C09D 7/40* | (2018.01) |
| *C08K 3/04* | (2006.01) |

(52) U.S. Cl.
CPC .............. *C09D 7/65* (2018.01); *C01B 32/174* (2017.08); *C01B 32/176* (2017.08); *C09D 5/24* (2013.01); *C09D 7/70* (2018.01); *C09D 11/52* (2013.01); *C09K 5/14* (2013.01); *H01B 1/24* (2013.01); *H01M 4/625* (2013.01); *B82Y 30/00* (2013.01); *B82Y 40/00* (2013.01); *C01B 2202/34* (2013.01); *C08K 3/041* (2017.05); *Y10S 977/742* (2013.01); *Y10S 977/842* (2013.01); *Y10S 977/932* (2013.01)

(58) Field of Classification Search
CPC ..... B82Y 30/00; B82Y 40/00; C07C 43/1745; C07C 69/612; C01B 32/174; C01B 32/158; C01B 32/159; C01B 2202/04; C01B 2202/06; C01B 2202/08
See application file for complete search history.

(56) References Cited

U.S. PATENT DOCUMENTS

| | | | |
|---|---|---|---|
| 4,746,325 A | 5/1988 | Nakamura et al. | |
| 2006/0189822 A1 | 8/2006 | Yoon et al. | |
| 2009/0226684 A1 | 9/2009 | Bahnmuller et al. | |
| 2013/0200310 A1 | 8/2013 | Rudhardt et al. | |

FOREIGN PATENT DOCUMENTS

| | | |
|---|---|---|
| CN | 101691280 A | 4/2010 |
| CN | 101696007 A | 4/2010 |
| CN | 103147355 A | 6/2013 |
| EP | 3002313 A1 | 4/2016 |
| KR | 20060084785 A | 7/2006 |
| KR | 100735996 B1 | 7/2007 |
| KR | 20090008008 A | 1/2009 |
| KR | 100913944 B1 | 8/2009 |
| KR | 20100051927 A | 5/2010 |

(Continued)

OTHER PUBLICATIONS

International Search Report from PCT/KR2015/004903, dated Aug. 12, 2015.

(Continued)

*Primary Examiner* — Haidung D Nguyen

(74) *Attorney, Agent, or Firm* — Lerner, David, Littenberg, Krumholz & Mentlik, LLP

(57) ABSTRACT

The present invention relates to a method for preparing carbon nanotubes which are capable of more effectively preparing carbon nanotubes having a uniform and fine size, and a dispersion composition of carbon nanotubes obtained using the same. The method for preparing carbon nanotube comprises the steps of: forming a dispersion comprising carbon nanotube bundles, a dispersant and a solvent; and enabling the dispersion to consecutively pass through a high pressure homogenizer, wherein the dispersant is a mixture of plural kinds of polyaromatic hydrocarbon oxides, and the carbon nanotube bundles are pulverized or disentangled while passing through a microchannel of the high pressure homogenizer under a shear force to form carbon nanotubes.

12 Claims, 12 Drawing Sheets

(56) References Cited

FOREIGN PATENT DOCUMENTS

| | | | |
|---|---|---|---|
| KR | 20100112040 | A | 10/2010 |
| KR | 20100112621 | A | 10/2010 |
| KR | 20100114816 | A | 10/2010 |
| KR | 20110031635 | A | 3/2011 |
| KR | 20110065704 | A | 6/2011 |
| KR | 20110072917 | A | 6/2011 |
| KR | 20110115560 | A | 10/2011 |
| KR | 20110115561 | A | 10/2011 |
| KR | 20110115954 | A | 10/2011 |
| KR | 20120075709 | A | 7/2012 |
| KR | 20120079597 | A | 7/2012 |
| KR | 20130121094 | A | 11/2013 |

OTHER PUBLICATIONS

Panagiotou, et al., "Deagglomeration and Dispersion of Carbon Nanotubes Using Microfluidizer® High Shear Fluid Processors," NSTI-Nanotech 2008, www.nsti.org. ISBN 978-1-4200-8503-7, vol. 1, pp. 39-42.
Search Report for Chinese Publication No. 106413949 (Chinese Application No. 201580025147.9) dated Jan. 4, 2018.

[FIG. 2a]
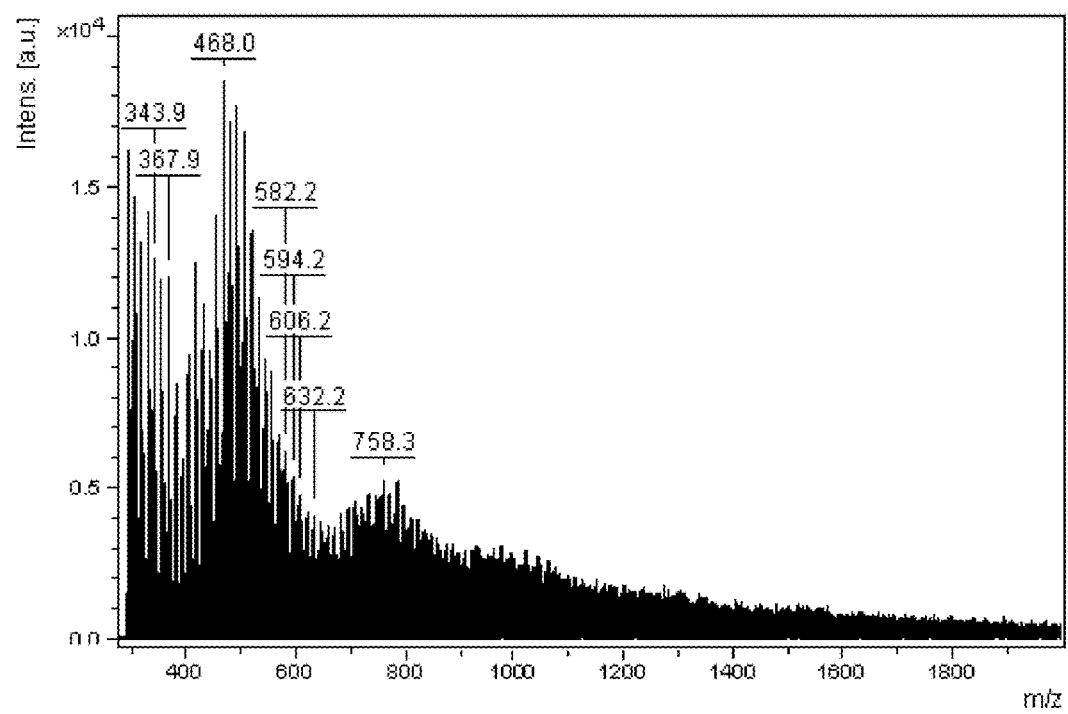

[FIG. 2b]
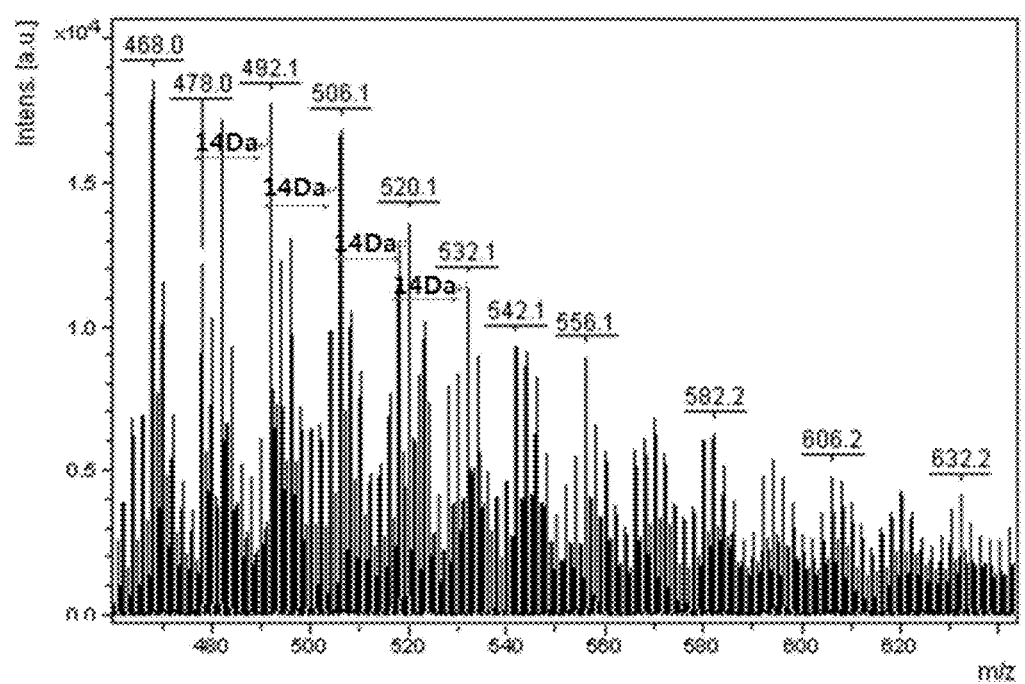

[FIG. 3a]
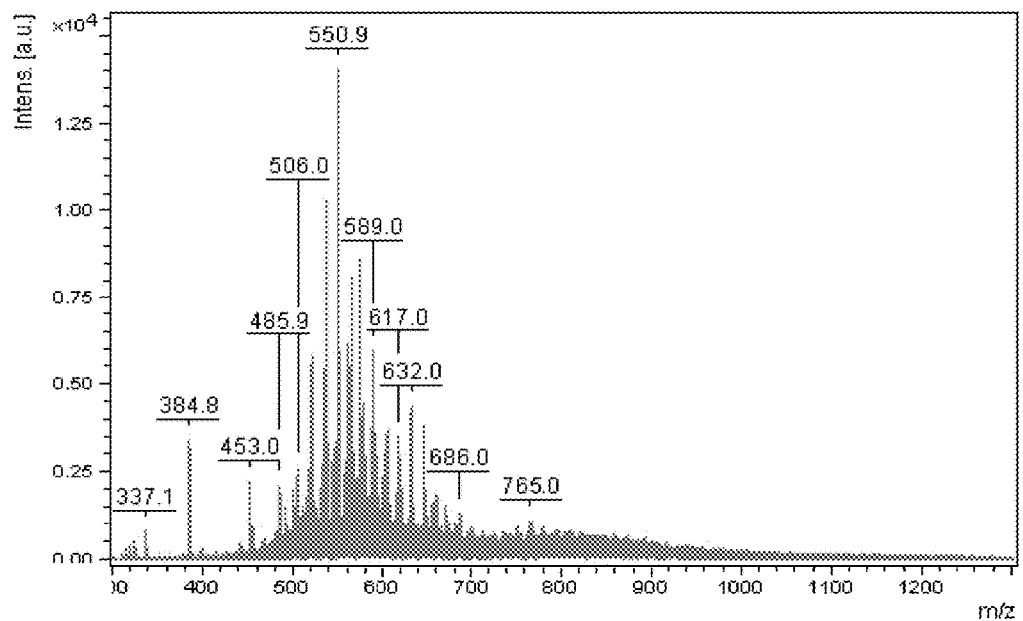
[FIG. 3b]
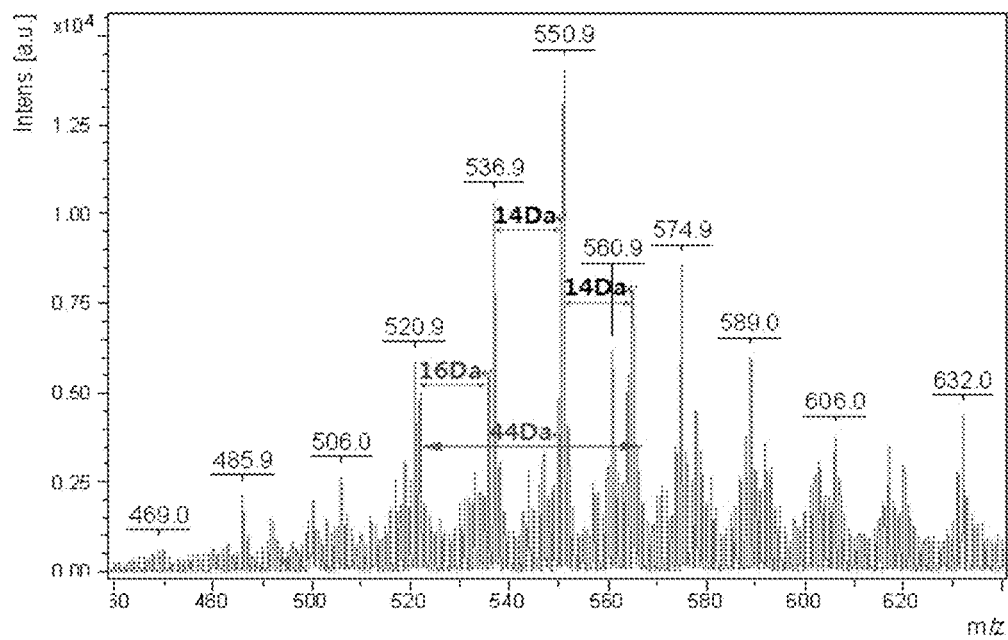

[FIG. 4]
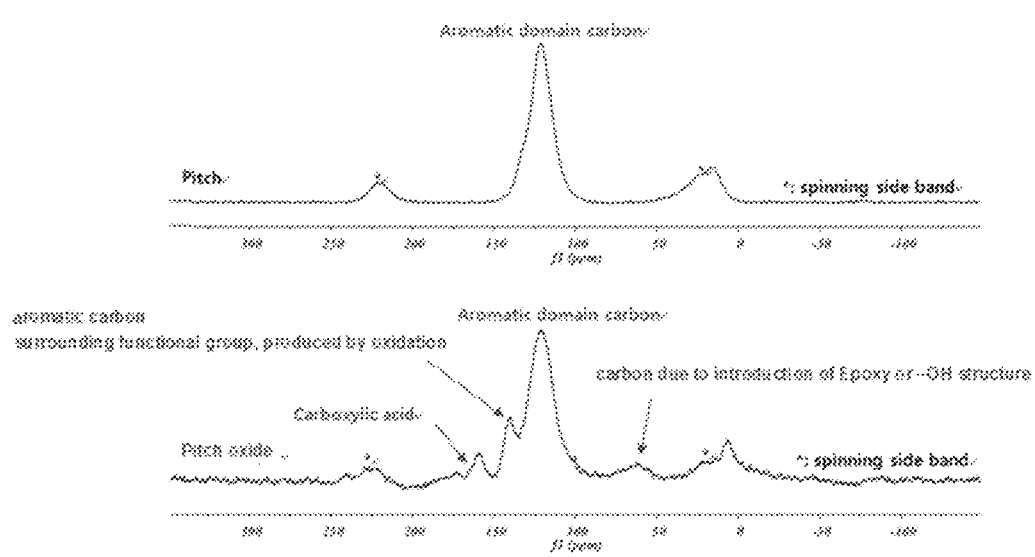

[FIG. 5]
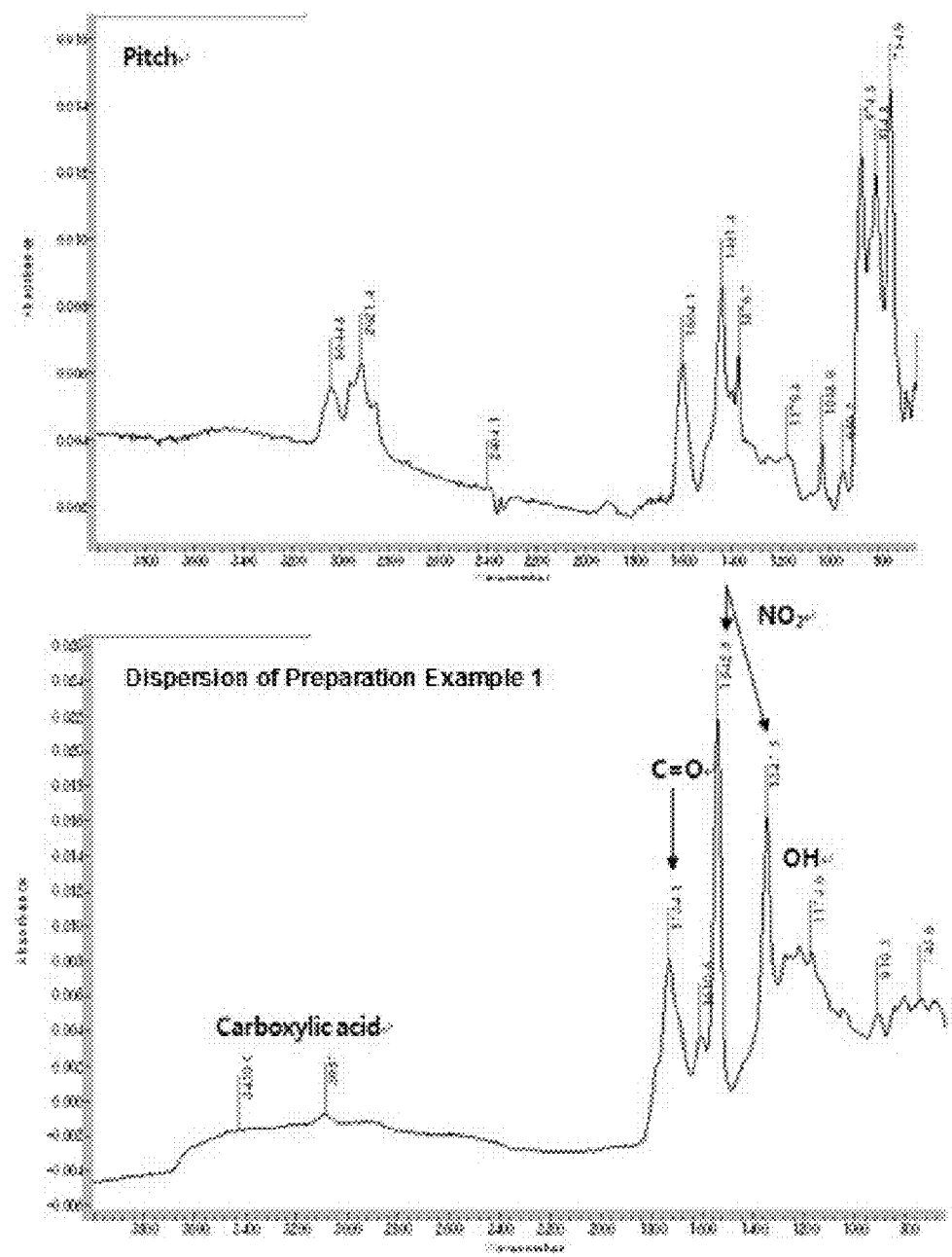

[FIG. 6]
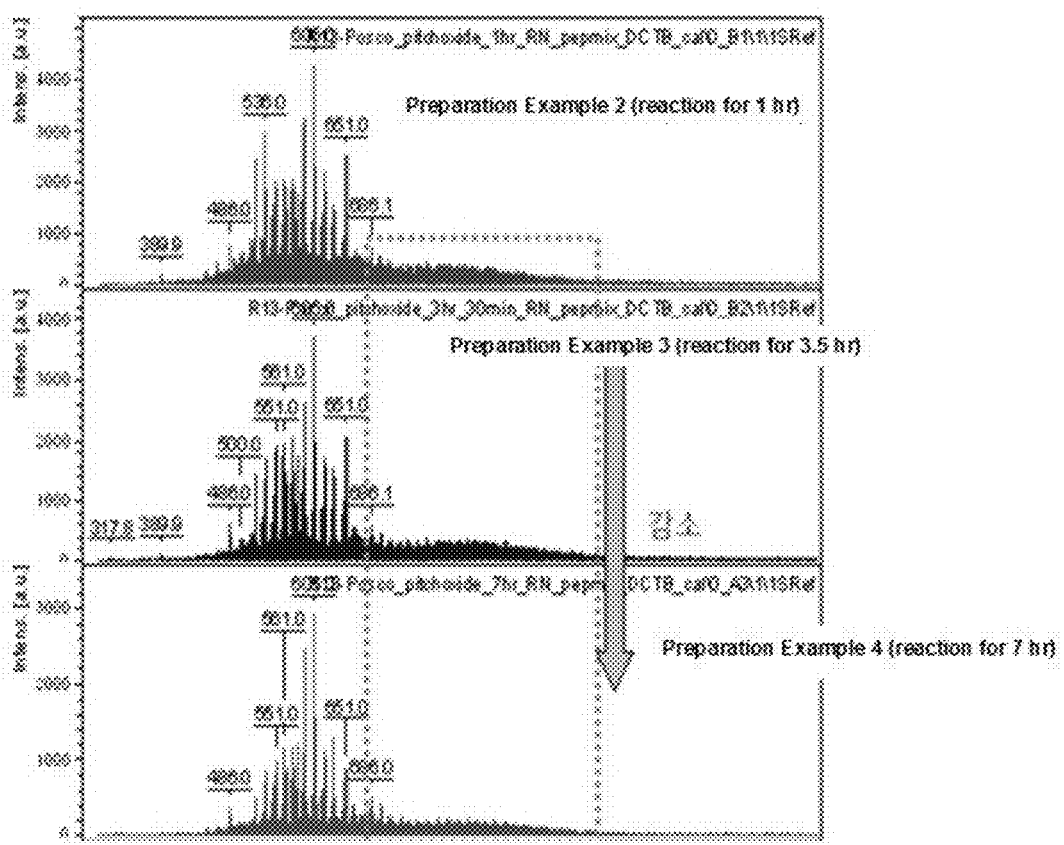

[FIG. 7]
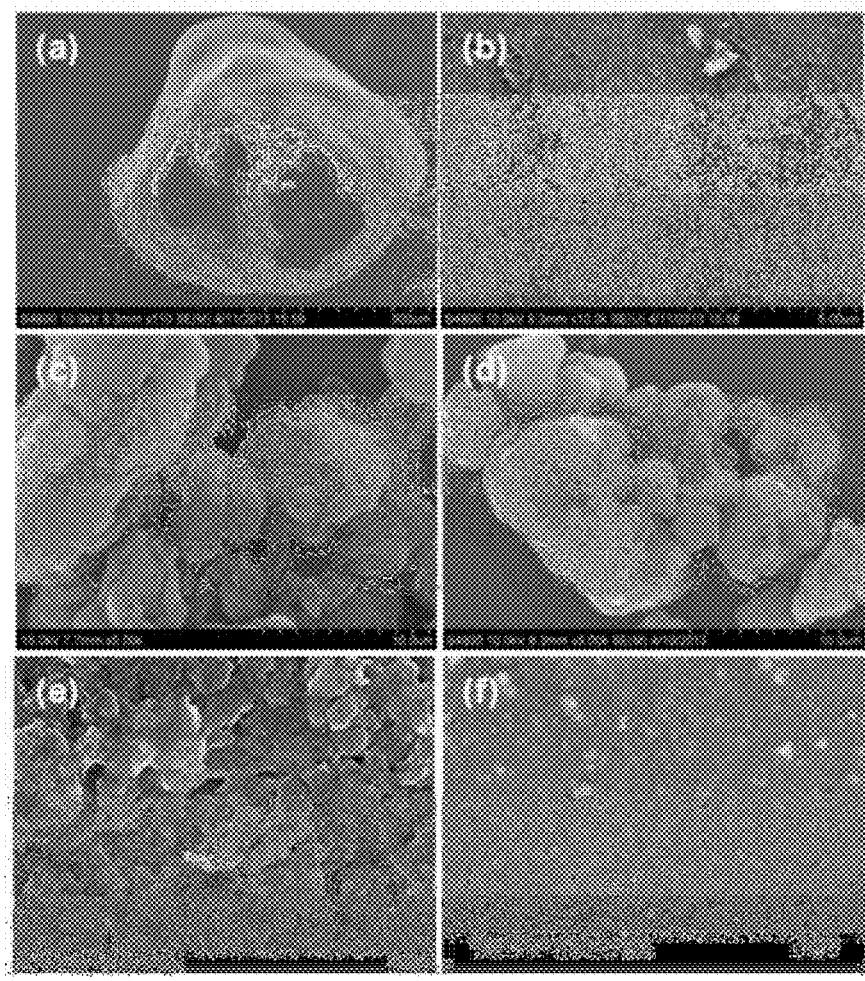

[FIG. 8]
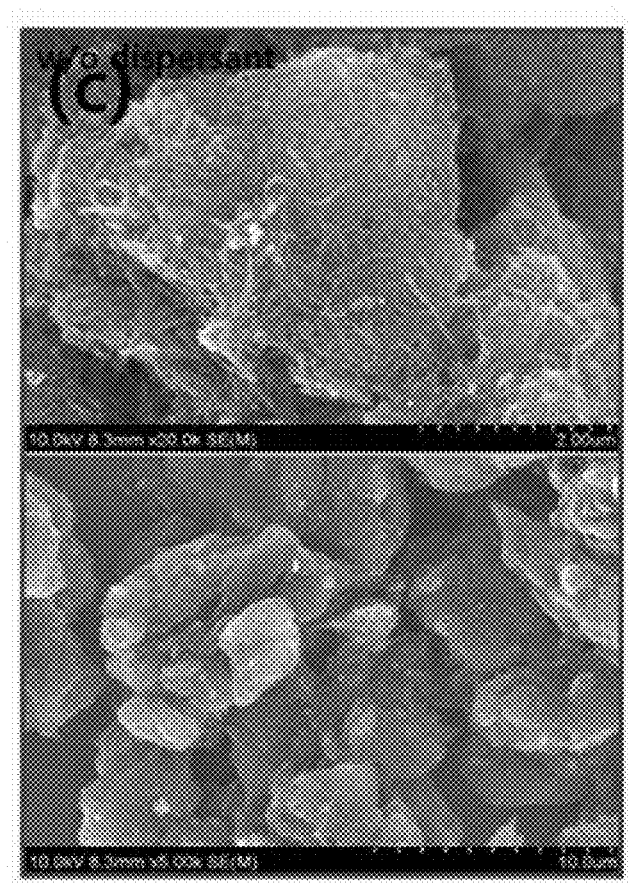
[FIG. 9]
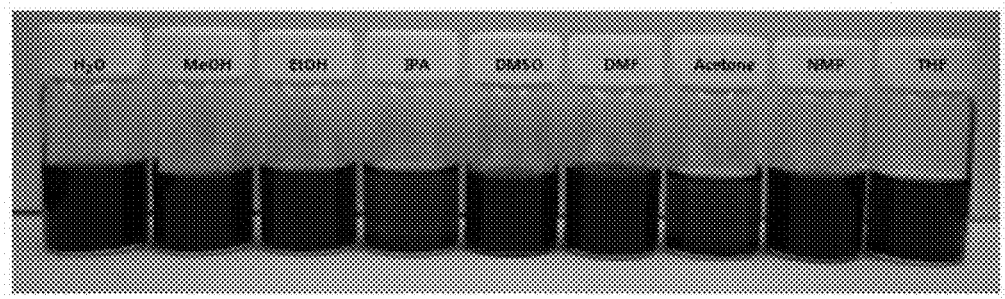

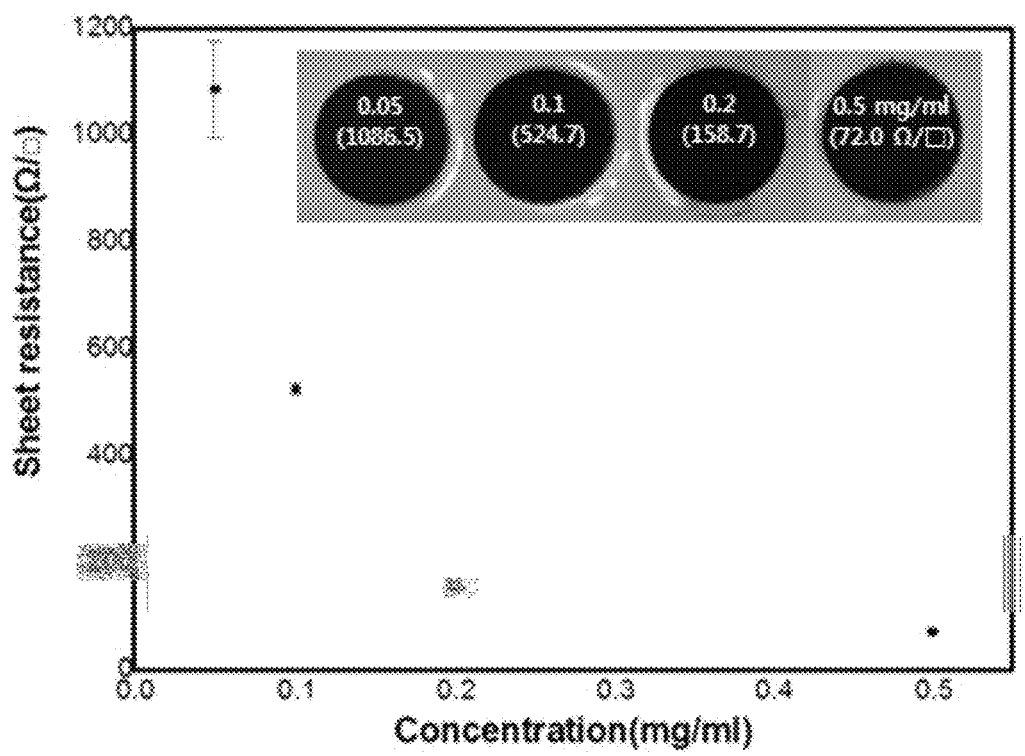
[FIG. 10]

[FIG. 11]
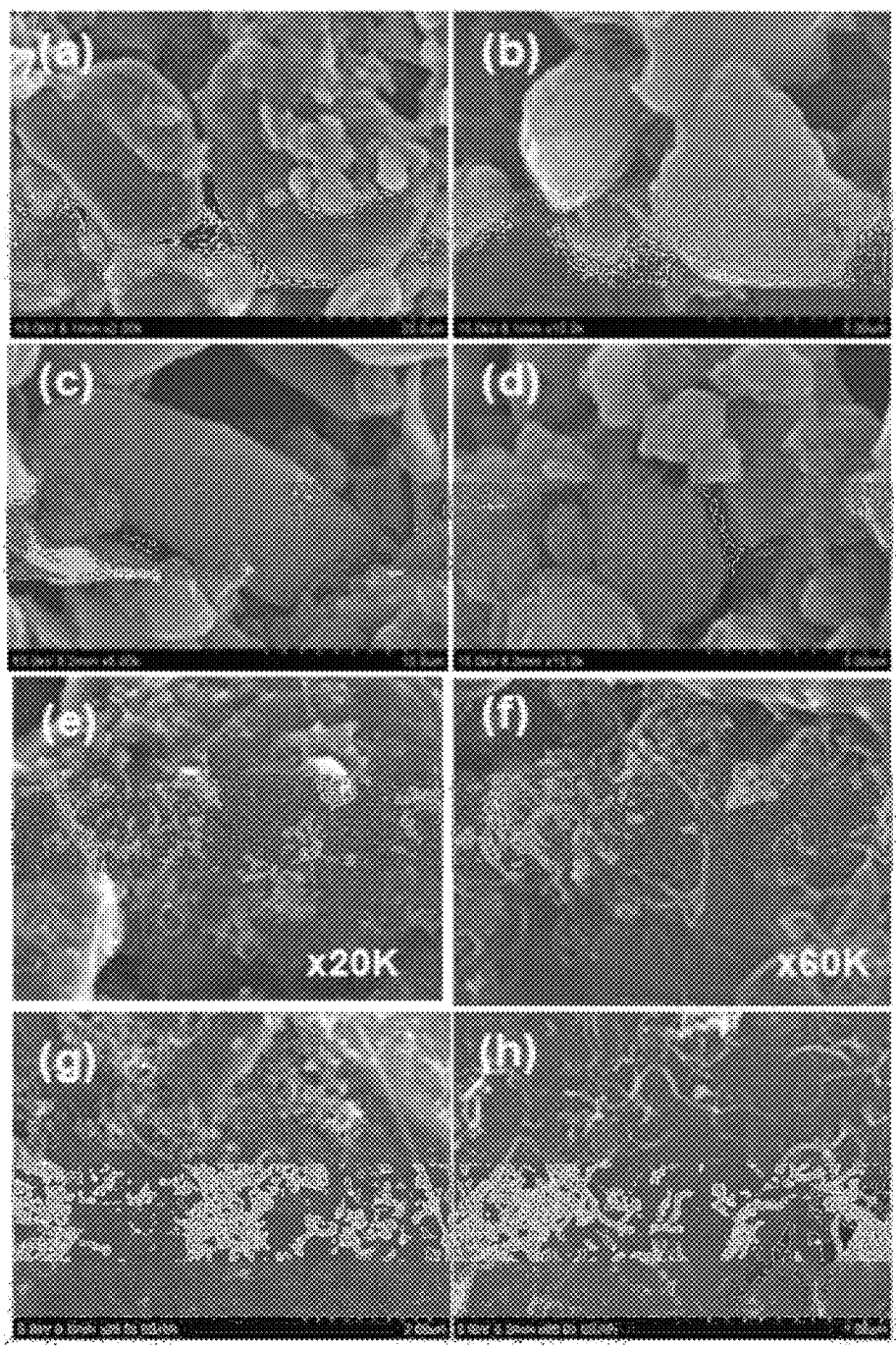

[FIG. 12]
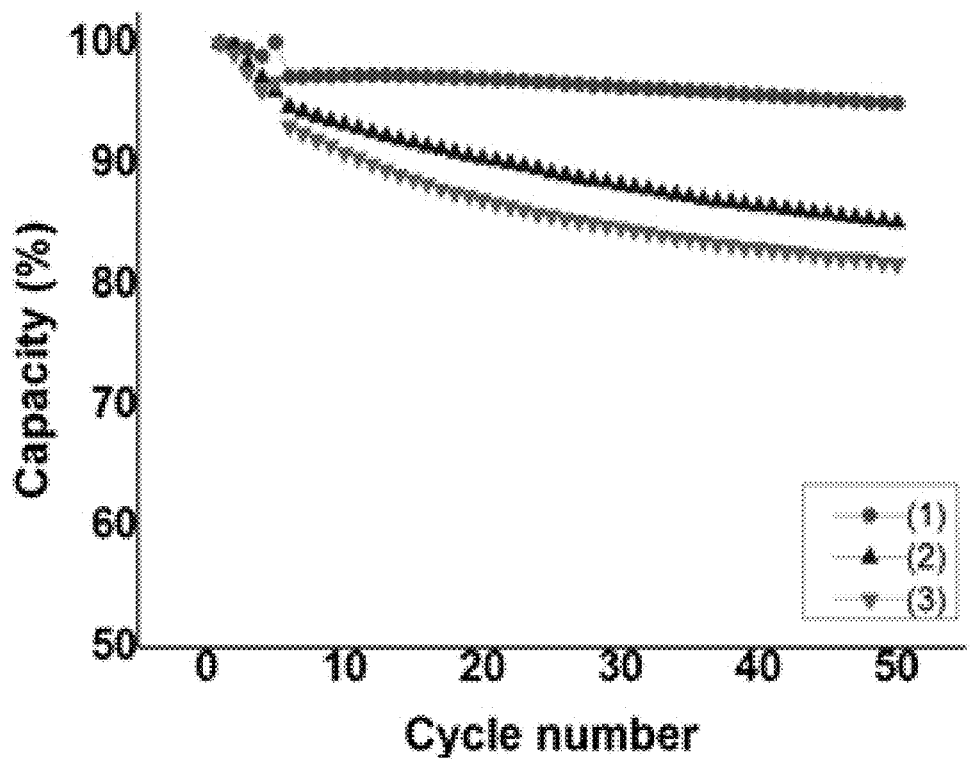
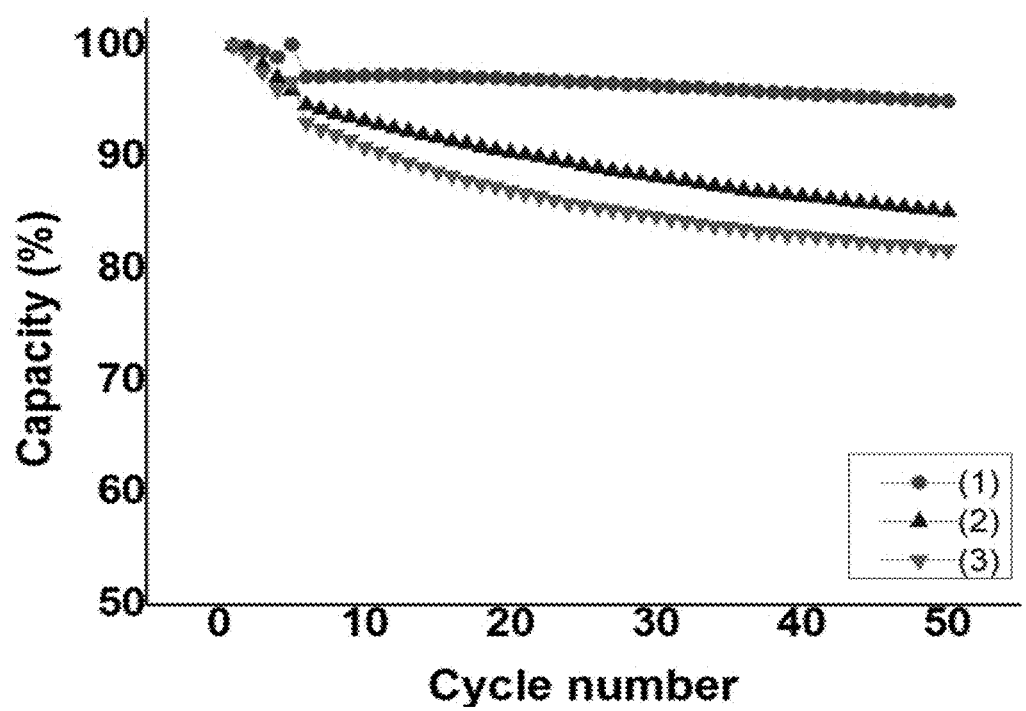

METHOD FOR PREPARING CARBON NANOTUBE, AND DISPERSION COMPOSITION OF CARBON NANOTUBE

CROSS-REFERENCE TO RELATED APPLICATIONS

This application is a national phase entry under 35 U.S.C. § 371 of International Application No. PCT/KR2015/004903, filed May 15, 2015, which claims priority to Korean Patent Application No. 10-2014-0061880, filed May 22, 2014 and Korean Patent Application No. 10-2015-0067343, filed May 14, 2015, the disclosures of which are incorporated herein by reference.

TECHNICAL FIELD

The present invention relates to a method for preparing carbon nanotubes which are capable of more effectively preparing carbon nanotubes having a uniform and fine size, and a dispersion composition of carbon nanotubes obtained using the same.

BACKGROUND

Carbon nanotubes have excellent conductivity and mechanical properties or the like, and thus there have been studied and attempted to use the carbon nanotubes as conductive materials, or reinforcement materials of various resin compositions, or the like, in various fields and applications such as a conductive paste composition, a conductive ink composition, a composition for forming a heat dissipation substrate, an electrically conductive composite, a composite for EMI shielding, or a conductive material for a battery.

These carbon nanotubes are mainly synthesized by a method such as CVD. The carbon nanotubes thus synthesized have generally a shape of carbon nanotube bundles in which long carbon nanotubes having a length of several tens of an are entangled like a skein of yarn. However, in order to take advantage of characteristics such as excellent conductivity and mechanical properties of carbon nanotubes, there is a need to uniformly obtain carbon nanotubes having a small length and size by pulverizing or disentangling these carbon nanotube bundles.

Previously, there have been known a number of methods for pulverizing or disentangling carbon nanotube bundles. Among them, wet or dry physical methods have mainly been used. Of course, methods for chemically pulverizing or disentangling carbon nanotube bundles have also been considered, but in this case, many defects may occur on the finally formed carbon nanotubes, which may lead to degradation in the properties of the carbon nanotubes.

As the above-described dry physical pulverization or disentanglement methods, methods such as ball milling or jet milling are mainly applied. And as the wet physical pulverization or disentanglement methods, the methods for pulverizing or disentangling carbon nanotube bundles by uniformly dispersing carbon nanotube bundles in a liquid medium together with a dispersant and performing solution-based ball milling, or by a method using ultrasonic irradiation are mainly applied.

However, with the dry physical pulverization or disentanglement method previously known, the size of carbon nanotube bundles can be reduced to some extent, but actually there is a limit to untangle and disentangle the tangled carbon nanotube bundles. Therefore, a large number of particles in the form of tangled bundles are present even in the finally produced carbon nanotubes. This make it difficult to effectively use the carbon nanotubes while taking advantage of characteristics such as excellent conductivity of the carbon nanotubes.

Furthermore, as the solution-based wet ball milling method has also similar problems, the tangled bundles cannot be effectively disentangled and this makes it difficult to effectively use the finally produced carbon nanotubes. In addition, in the case of the ultrasonic irradiation method among the wet pulverization or disentanglement methods, the effect of pulverizing carbon nanotube bundles is not sufficient and thus, there is a disadvantage that, in order to pulverize or disentangle these bundles, there is need to proceed the step for a long period of time and it is difficult to apply to a mass production of carbon nanotubes.

Due to the problems of those prior art methods, there is a continued need for the method for preparing carbon nanotubes which are capable of effectively disentangling or pulverizing the carbon nanotube bundles entangled like a skein of yarn and easily preparing carbon nanotubes having a uniform and fine size.

SUMMARY OF THE INVENTION

The present invention provides a method for preparing carbon nanotubes which are capable of effectively disentangling or pulverizing the carbon nanotube bundles entangled like a skein of yarn and easily preparing carbon nanotubes having a uniform and fine size.

The present invention also provides a dispersion composition of carbon nanotubes in which carbon nanotubes having a uniform and fine size are uniformly dispersed in a polar solvent, comprising the carbon nanotubes obtained by using the above preparation method.

The present invention provides a method for preparing carbon nanotubes comprising the steps of: forming a dispersion comprising carbon nanotube bundles having a first length, a dispersant and a solvent; and enabling the dispersion to consecutively pass through a high pressure homogenizer comprising an inlet, an outlet, and a microchannel for connecting the inlet and the outlet and having a micrometer scale diameter, wherein the dispersant is a mixture of plural kinds of poly-aromatic hydrocarbon oxides and includes a mixture containing polyaromatic hydrocarbon oxides having a molecular weight of 300 to 1000 in an amount of 60% by weight or more, and the carbon nanotube bundles having the first length are pulverized or disentangled while passing through the microchannel under the application of a shear force to form carbon nanotubes having a second length shorter than the first length.

In the preparation method of carbon nanotubes, the carbon nanotube bundles may have a first length of 20 µm or more, and the carbon nanotubes finally prepared therefrom may have a second length of about 0.1 to 10 µm.

Also, the dispersion may be a dispersion in which a carbon nanotube bundle and a dispersant are dissolved or dispersed in an aqueous solvent or a polar organic solvent.

And the dispersant may have an oxygen content of about 12 to 50% by weight based on a total element content, when the plural kinds of polyaromatic hydrocarbon oxides contained in the dispersant is subjected to elemental analysis.

Further, the polyaromatic hydrocarbon oxides contained in the dispersant may have a structure in which one or more oxygen-containing functional groups are bonded to an aromatic hydrocarbon containing 5 to 30 or 7 to 20 benzene rings.

Meanwhile, in the above-described preparation method of carbon nanotubes, the microchannel of the high pressure homogenizer may have a diameter of about 50 to 800 µm. Further, while the dispersion may be introduced in the inlet of the high pressure homogenizer under application of pressure of about 100 to 3000 bar and passed through the microchannel, carbon nanotube bundles can be pulverized and disentangled, thereby preparing a carbon nanotube having a smaller second length.

The above-described preparation method of carbon nanotubes may further comprise recovering and drying carbon nanotubes having the second length from the dispersion passed through a high pressure homogenizer. In this case, the recovering step can be performed by centrifugation, vacuum filtration or pressure filtration, and the drying step can performed by vacuum-drying at a temperature of about 30 to 200° C.

Meanwhile, the present invention provides a dispersion composition of carbon nanotubes prepared by the above-described method. Such dispersion composition comprises: carbon nanotubes wherein a dispersant, which is a mixture of plural kinds of polyaromatic hydrocarbon oxides and includes a mixture containing polyaromatic hydrocarbon oxides having a molecular weight of 300 to 1000 in an amount of 60% by weight or more, is physically attached to the surface; and a polar solvent for dissolving or dispersing the carbon nanotubes.

In such dispersion composition, the carbon nanotubes are prepared by the above-described method and may have a shape wherein the bundles are completely untangled and disentangled. The carbon nanotubes may have a fine second length of about 0.1 to 10 µm.

Further, the dispersion composition can be prepared by forming carbon nanotubes in which the dispersant is physically attached to the surface and then dissolving or dispersing it in a polar solvent.

Furthermore, in the dispersion composition, the polar solvent may include one or more selected from the group consisting of water, NMP, acetone, DMF, DMSO, ethanol, isopropyl alcohol, methanol, butanol, 2-ethoxyethanol, 2-butoxyethanol, 2-methoxypropanol, THF, ethylene glycol, pyridine, dimethyl acetamide, N-vinyl pyrrolidone, methyl ethyl ketone, butanone, alpha-terpinol, formic acid, ethyl-acetate and acrylonitrile.

In addition, in the dispersion composition, the carbon nanotubes in which the dispersant is physically attached to the surface may be contained in an amount of about 50 parts by weight or less based on 100 parts by weight of the polar solvent.

The above-described dispersion composition of the carbon nanotubes is a composition in which a high concentration of carbon nanotubes are dispersed in a polar solvent, and can be preferably used to prepare a composition or composite with a variety of applications such as a conductive paste composition, a conductive ink composition, a composition for forming a heat dissipation substrate, an electrically conductive composite, a composite for EMI shielding, or a conductive material for a battery.

ADVANTAGEOUS EFFECTS

According to the present invention, due to the use of a high pressure homogenizer and the use of a specific dispersant, the carbon nanotube bundles entangled like a skein of yarn can be effectively disentangled or pulverized and the carbon nanotubes having a uniform and fine size can be easily prepared.

The carbon nanotubes thus obtained can exhibit excellent redispersibility in various polar solvents with a specific dispersant, and thus they can be preferably used to prepare a composition or composite or the like with a variety of applications such as a conductive paste composition, a conductive ink composition, a composition for forming a heat dissipation substrate, an electrically conductive composite, a composite for EMI shielding, or a conductive material for a battery.

Ultimately, according to the present invention, it is possible to efficiently prepare the carbon nanotubes having a more uniform and fine size in a state where each of the particles are well untangled. These carbon nanotubes can be re-dispersed in a high concentration in various polar solvents to obtain a dispersion composition thereof. Therefore, while efficiently utilizing excellent properties of carbon nanotubes such as excellent conductivity or mechanical properties, it is possible to preferably apply to various fields and applications.

BRIEF DESCRIPTION OF DRAWINGS

FIGS. 2a and 2b (enlarged views in a range of molecular weight of 400 to 500) are views illustrating the results obtained by analyzing the molecular weight distribution of pitch used for the preparation of a dispersant of Preparation Examples by a MALDI-TOF mass spectrum.

FIGS. 3a and 3b (enlarged views in a range of molecular weight range of 400 to 500) are views illustrating the results obtained by analyzing the molecular weight distribution of a dispersant obtained in Preparation Example 1 by a MALDI-TOF mass spectrum.

FIG. 4 is a view illustrating the analysis results obtained by analyzing a pitch and a dispersant of Preparation Example 1 by a 13C CPMAS NMR, respectively.

FIG. 5 is a view illustrating the analysis results obtained by analyzing a pitch and a dispersant of Preparation Example 1 by a FT-IR, respectively.

FIG. 6 is a view illustrating comparison of the analysis results obtained by analyzing the molecular weight distribution of dispersants each of which is obtained in Preparation Examples 2 to 4 by a MALDI-TOF mass spectrum.

FIG. 7 shows electron micrographs of carbon nanotubes each of which is obtained in Preparation Example 1 and Comparative Examples 1 to 3, and electron micrographs of carbon nanotube bundles used as raw materials.

FIG. 8 shows electron micrographs of carbon nanotubes obtained in Comparative Example 4.

FIG. 9 is a photograph of the observation with the naked eye illustrating the evaluation results of the redispersibility after re-dispersing the carbon nanotubes obtained in Example 1 in various solvents, in Experimental Example 2.

FIG. 10 is a photograph illustrating the measurement results of the sheet resistance, after preparing a film using the carbon nanotubes of Example 1, in Experimental Example 3.

FIG. 11 is a photograph illustrating comparison of the surface states observed by an electron microscope, after preparing a negative electrode using the carbon nanotubes of Example 1 and Comparative Examples 1 to 3.

FIG. 12 is a photograph illustrating comparison of the capacity retention and the life cycle characteristics of lithium secondary battery prepared by using a conductive material containing carbon nanotubes of Example 1 and Comparative Example 3, and a carbon black, respectively.

DETAILED DESCRIPTION OF THE EMBODIMENTS

Figure 1:
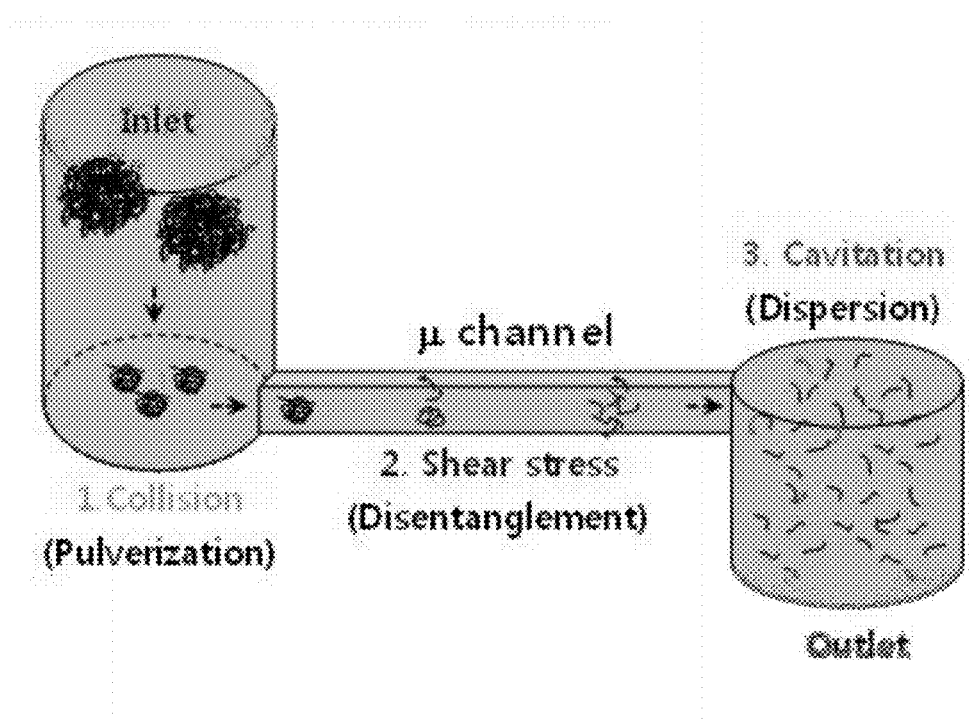
FIG. 1 is an outlined schematic view showing a principle of a high-pressure homogenizer usable in the preparation method of carbon nanotubes of one embodiment.

Hereinafter, a preparation method of carbon nanotubes according to specific embodiments of the present invention, and a dispersion composition of carbon nanotubes will be described in more detail.

Some of the terms used in the description below may be defined as follows.

First, in the description below, the term "dispersant" may refer to any component for uniformly dispersing other components, for example, a carbon nanotube bundle, or a carbon nanotube or the like prepared therefrom, within an aqueous solvent, an organic solvent, or other liquid medium. A composition in which other components to be dispersed such as the "dispersant" and carbon nanotubes are dispersed within a liquid medium may be referred to as "dispersion" or a "dispersion composition", and such "dispersion" or "dispersion composition" may be present in different states such as a liquid state, a slurry state or a paste state. Further, such "dispersion" or "dispersion composition" may be used in various applications such as a composition used in the preparing process of carbon nanotubes which will be described below; a conductive material composition for a secondary battery; a composition for electrode or conductive composition applied in the preparing process of various batteries, displays, devices, or the like; an active material composition for a secondary battery and the like; a composition for preparing various polymers or resin composites; or an ink or paste composition applied in the preparing process of various electronic materials, devices, or the like; and the use thereof is not particularly limited. If only the "dispersant" and a component to be dispersed are included together within a liquid medium, it may be defined as belonging to a category of the "dispersion" or "dispersion composition", regardless of the state or use thereof.

Further, in the description below, "polyaromatic hydrocarbon" may refer to an aromatic hydrocarbon compound in which aromatic rings, for example, two or more, or five or more benzene rings are bonded to and contained in a single compound structure. Further, "polyaromatic hydrocarbon oxide" may refer to any compound in which one or more oxygen-containing functional groups are bonded within the chemical structure, by the reaction of the above-described "polyaromatic hydrocarbon" with an oxidant. Herein, the oxygen-containing functional groups to be introduced in the "polyaromatic hydrocarbon" by the reaction with the oxidant may be any functional group which may be bonded to the aromatic ring, and contains one or more oxygens in the functional group, such as a hydroxy group, an epoxy group, a carboxy group, a nitro group or sulphonic acid.

Meanwhile, according to one embodiment of the invention, there is provided a method for preparing carbon nanotubes comprising the steps of: forming a dispersion comprising carbon nanotube bundles having a first length, a dispersant and a solvent; and enabling the dispersion to consecutively pass through a high pressure homogenizer comprising an inlet, an outlet, and a microchannel for connecting the inlet and the outlet and having a micrometer scale diameter, wherein the dispersant is a mixture of plural kinds of polyaromatic hydrocarbon oxides and includes a mixture containing polyaromatic hydrocarbon oxides having a molecular weight of 300 to 1000 in an amount of 60% by weight or more, and the carbon nanotube bundles having the first length are pulverized or disentangled while passing through the microchannel under the application of a shear force to form carbon nanotubes having a second length shorter than the first length.

In the preparation method of carbon nanotubes according to one embodiment, after the carbon nanotube bundles synthesized by a conventional method such as CVD are uniformly dispersed in a solvent in the presence of a specific dispersant, these bundles can be passed through a high pressure homogenizer, thereby allowing pulverization and disentanglement. Through this process, it is possible to prepare carbon nanotubes having a second length shorter than the carbon nanotube bundles having the first length. In particular, it is possible to efficiently untangle carbon nanotubes in which long carbon nanotubes are entangled like a skein of yarn, thereby preparing carbon nanotubes in which carbon nanotube particles having uniform and fine sizes are present in a well untangled state.

In particular, as supported by the following Examples, as carbon nanotube bundles are pulverized and disentangled using a high pressure homogenizer, it has been confirmed that, as compared to the other dry or wet pulverization and disentanglement methods previously known, the carbon nanotube bundles entangled like a skein of yarn can be more efficiently disentangled, and the carbon nanotubes having more uniform and fine sizes can be effectively obtained within a short period of time.

In addition, in the method of one embodiment, a specific dispersant that will be described later is used. Although described in more detail below, it has been found that such a dispersant can represent an excellent dispersibility to uniformly disperse the carbon nanotube bundles or the carbon nanotubes in a high concentration, due to the structural feature thereof Due to excellent dispersibility of the dispersant, a carbon nanotube bundle which is a raw material in the preparation method of one embodiment can be more uniformly dispersed in a high concentration. Therefore, the raw material is pulverized and disentangled in such an optimized dispersed state, and thus, carbon nanotubes having more uniform and fine sizes in a well untangled state can be more easily prepared. Furthermore, since the dispersant can be maintained in a state physically attached to the surface of the finally formed carbon nanotubes, the carbon nanotubes prepared by the method of one embodiment may exhibit excellent dispersing properties per se in various polar solvents.

Therefore, according to the method of one embodiment, it is possible to more easily and effectively obtain the carbon nanotubes in which particles having uniform and fine sizes are present in a well untangled state. Further, while taking advantage of excellent properties of these carbon nanotubes, it can be preferably applied to various uses.

Meanwhile, hereinafter, a preparation method of carbon nanotubes according to one embodiment will be described in more detail for each step.

In the preparation method of carbon nanotubes according to one embodiment as described above, first, a dispersion including a carbon nanotube bundle having a first length, a dispersant and a solvent may be formed. Herein, the carbon nanotube bundle can be synthesized by any method previously applied for the synthesis of carbon nanotubes, such as CVD, and it may be in a state where carbon nanotubes having a first length, for example, a very long length of about 20 μm or more, or about 30 μm or more, or about 50 μm or more, or about 20 μm to 500 μm are entangled like a skein of yarn.

The first length of these carbon nanotube bundles may be measured by a method of observing and analyzing them by a scanning electron microscope (SEM) or transmission electron microscope (TEM) and the like. As the carbon nanotube bundles take a form wherein very long bundles are entangled like a skein of yarn, it is difficult to apply these to various compositions or composites. While the carbon nanotubes entangled like a skein of yarn are disentangled, they are pulverized into a uniform and fine size to prepare a desired carbon nanotube, and then their application is necessary.

Moreover, the dispersion may be a dispersion in which a carbon nanotube bundle and a dispersant are dissolved or dispersed in an aqueous solvent or a polar organic solvent. Since this dispersion may be present in a state where the carbon nanotube bundles are uniformly dispersed by the action of a dispersant, subsequent pulverization and disentanglement processes may proceed in such an optimized dispersed state to effectively disentangle the carbon nanotube bundle and properly obtain a carbon nanotube having a uniform and fine size.

In addition, in the dispersion used as a raw material, the aqueous solvent or the polar organic solvent may include any aqueous solvent or polar organic solvent such as one or more selected from the group consisting of water, NMP, acetone, DMF (N,N-dimethylformamide), DMSO (dimethyl sulfoxide), ethanol, isopropyl alcohol, methanol, butanol, 2-ethoxy ethanol, 2-butoxy ethanol, 2-methoxy propanol, THF (tetrahydrofuran), ethylene glycol, pyridine, dimethylacetamide, N-vinyl pyrrolidone, methyl ethyl ketone (butanone), α-terpinol, formic acid, ethyl acetate and acrylonitrile.

Meanwhile, in the method of one embodiment, as the dispersant, a certain dispersant which is a mixture of plural kinds of polyaromatic hydrocarbon oxides and includes a mixture containing polyaromatic hydrocarbon oxides having a molecular weight of about 300 to 1000 in a content of about 60% by weight or more, may be used.

The certain dispersant was newly prepared by the present inventors, and filed as Korean Patent Application No. 10-2013-0091625 (Aug. 1, 2013), and it will be described in detail as follows.

Pitch which is discharged as a residue and the like in a refining process of fossil fuels such as petroleum or coal, is a byproduct used for asphalt production, and the like, and may be formed as a viscous mixture containing plural kinds of polyaromatic hydrocarbons having a plurality of aromatic rings. However, as a result of the present inventor's experiment, it was confirmed that if such pitch and the like undergo an oxidation process using an oxidant, among polyaromatic hydrocarbons contained in the pitch, polyaromatic hydrocarbons having excessively large molecular weight are at least partly decomposed, and a mixture of polyaromatic hydrocarbons having a relatively narrow molecular weight distribution is obtained. In addition, it was confirmed that as one or more oxygen-containing functional groups are introduced in the aromatic ring of each polyaromatic hydrocarbon, a mixture containing plural kinds of polyaromatic hydrocarbon oxides is obtained.

Specifically, a mixture of polyaromatic hydrocarbon oxides obtained in this method was confirmed to contain polyaromatic hydrocarbon oxides having a molecular weight of about 300 to 1000, or about 300 to 700 in about 60% by weight or more, or about 65% by weight or more, or about 70 to 95% by weight, as analyzed by MALDI-TOF MS. Specific kinds, structure, distribution and the like of the polyaromatic hydrocarbon oxides contained in the mixture may vary depending on the kind or origin of the pitch as a raw material, the kind of an oxidant, or the like. However, at least, the mixture of the polyaromatic hydrocarbon oxides included in the dispersant contains plural kinds of polyaromatic hydrocarbon oxides having a structure where one or more oxygen-containing functional groups are introduced in each polyaromatic hydrocarbon having 5 to 30, or 7 to 20 benzene rings, respectively, and the polyaromatic hydrocarbon oxides in the mixture have the above-described molecular weight distribution, that is, a molecular weight distribution where oxides having a molecular weight of about 300 to 1000, or about 300 to 700 are contained in about 60% by weight or more, based on the total compound.

Herein, the kind of the oxygen-containing functional group may vary depending on the kind of the oxidant used in the oxidation process of the pitch and the like, but for example, may be one or more selected from the group consisting of a hydroxy group, an epoxy group, a carboxy group, a nitro group and sulphonic acid.

The polyaromatic hydrocarbon oxides satisfying the above-described structural feature, the molecular weight distribution and the like, and the mixture thereof may have both a hydrophobic π-domain gathering aromatic rings, and a hydrophilic region by the oxygen-containing functional groups bonded to the aromatic ring and the like, at the same time. Among these, the hydrophobic π-domain may π-π interact with a surface of carbon nanotube bundles or carbon nanotubes or the like, and the hydrophilic region may express repulsion between each single carbon nanotube bundle or carbon nanotube. As a result, the above-described dispersant including a mixture of polyaromatic hydrocarbon oxides may be present between the molecules of the carbon nanotube bundles or the carbon nanotubes in a liquid medium such as an aqueous solvent or a polar organic solvent, and uniformly disperse them. Therefore, it was confirmed that the dispersant may represent an excellent dispersion force to uniformly disperse carbon nanotube bundles or carbon nanotubes in a higher concentration even in the case of using relatively small amount.

Moreover, since the above-described dispersant represents water-solubility per se due to the presence of a hydrophilic region by the oxygen-containing functional group and the like, it may uniformly disperse carbon nanotube bundles or carbon nanotubes even in an environmentally friendly aqueous solvent. Particularly, the dispersant was confirmed to represent an excellent dispersibility to uniformly disperse the carbon nanotube bundle or carbon nanotube in a high concentration, in various polar organic solvents, as well as an environmentally friendly aqueous solvent.

Due to the excellent dispersibility of the dispersant, in the preparation method of one embodiment, the carbon nanotube bundle as a raw material may be more uniformly dispersed in a high concentration. Therefore, by pulverizing and disentangling the raw material in such optimized dispersed state, a carbon nanotube having a more uniform and fine size in a well untangled state may be more easily prepared. Moreover, since the dispersant may be maintained in a state of being physically attached to the surface of the finally formed carbon nanotubes, the carbon nanotube prepared in the method of one embodiment may represent excellent dispersibility per se in various polar solvents, and the like.

Meanwhile, the above-described dispersant may have an oxygen content in the total mixture of about 12 to 50% by weight, or about 15 to 45% by weight, based on the total element content, when the plural kinds of polyaromatic hydrocarbon oxides contained in the dispersant are subjected to elemental analysis. Such oxygen content reflects a degree of the introduction of the oxygen-containing functional group by the oxidation process in the polyaromatic hydrocarbon oxides, and as the oxygen content is satisfied, the above-described hydrophilic region may be included in an appropriate degree. As a result, in the above-described method of one embodiment, a carbon nanotube bundle as a raw material may be more uniformly dispersed using the dispersant; a carbon nanotube having a more uniform and fine size may be more effectively obtained therefrom; and the dispersibility of the finally prepared carbon nanotube may also be more improved.

The oxygen content may be calculated by elemental analysis of the plural kinds of polyaromatic hydrocarbon oxides contained in the above-described mixture. That is, when a sample of the mixture (for example, about 1 mg) is, for example, heated at a high temperature of nearby about 900° C. on a thin foil, the foil is instantaneously melted so that the temperature can be raised to about 1500 to 1800° C., and by such high temperature, gas is generated from the mixture sample, thereby collecting the generated gas, and measuring and analyzing the element content thereof. As a result of the elemental analysis, total element contents of carbon, oxygen, hydrogen and nitrogen contained in the plural kinds of polyaromatic hydrocarbon oxides may be measured and analyzed, and the oxygen content to the total element content may be calculated.

Meanwhile, the above-described dispersant may be prepared by a method including oxidizing the mixture containing polyaromatic hydrocarbons having a molecular weight of about 200 to 1500.

As already described above, pitch discharged as a residue or the like in the refining process of fossil fuels such as petroleum or coal, may contain plural kinds of polyaromatic hydrocarbons, and it may be in a mixture state of being viscous or in a powder form. Of course, the specific kinds, structure, compositional ratio or molecular weight distribution of the polyaromatic hydrocarbons may vary depending on the raw material or origin of the pitch, however, the pitch may include plural kinds of polyaromatic hydrocarbons containing for example, 5 to 50 aromatic rings, for example, benzene rings in the structure, and largely include polyaromatic hydrocarbons having a molecular weight of about 200 to 1500. For example, a mixture containing polyaromatic hydrocarbons having a molecular weight of about 200 to 1500 (e.g., pitch), used as a starting material in a method of preparing the dispersant, may include the polyaromatic hydrocarbons in such molecular weight range in a content of about 80% by weight or more, or about 90% by weight or more.

However, if a mixture containing polyaromatic hydrocarbons such as the pitch undergo an oxidation process using an oxidant, among polyaromatic hydrocarbons contained in the pitch, polyaromatic hydrocarbons having excessively large molecular weight may be decomposed, and a mixture of polyaromatic hydrocarbons having a relatively narrow molecular weight distribution may be obtained. For example, polyaromatic hydrocarbons having a molecular weight of more than about 1000, or about 700 may be decomposed to those having a less molecular weight. In addition, as one or more oxygen-containing functional groups are also introduced in each aromatic ring of each polyaromatic hydrocarbon, a mixture containing plural kinds of polyaromatic hydrocarbon oxides, that is, a dispersant used in the method of one embodiment may be very simply prepared.

In the method for preparing the dispersant, the kind of oxidant is not particularly limited, and any oxidant may be used without limitation, as long as it causes an oxidation reaction to introduce an oxygen-containing functional group in an aromatic hydrocarbon. Specific examples of the oxidant may include nitric acid ($HNO_3$), sulfuric acid ($H_2SO_4$), hydrogen peroxide ($H_2O_2$), ammonium cerium(IV) sulfate (($NH_4$)$_4$Ce($SO_4$)$_4$), ammonium cerium(IV) nitrate (($NH_4$)$_2$Ce($NO_3$)$_6$), or the like, and of course, a mixture of two or more selected therefrom may also be used.

Further, such oxidation process may proceed at a reaction temperature of about 10 to 110° C. for about 0.5 to 20 hours, in an aqueous solvent. As a specific example, the mixture containing the polyaromatic hydrocarbons may be added in a certain amount, in the presence of a liquid phase oxidant such as sulfuric acid and/or nitric acid, and the oxidation process may proceed at room temperature, for example, at about 20° C. or 80° C., for about 1 to 12 hours. As the reaction temperature, hour or the like in the oxidation process is controlled, the properties of the above-described dispersant, for example, an oxidation degree of the polyaromatic hydrocarbons may be properly adjusted to prepare a dispersant having a desired property.

Further, as described above, the mixture containing polyaromatic hydrocarbons having a molecular weight of about 200 to 1500, which is a starting material of the preparation method, may be derived from pitch obtained from fossil fuels or a product thereof, and depending on the kind of the raw materials, the kind, structure or molecular weight distribution of the polyaromatic hydrocarbons may be different from each other. Nevertheless, as the mixture containing the polyaromatic hydrocarbons having a molecular weight of about 200 to 1500, derived from the pitch and the like undergoes the oxidizing step, the above-described dispersant representing an excellent dispersion force to carbon based materials may be simply prepared.

Meanwhile, the preparation method as described above may further include a step of purifying the resulting product after the oxidization step to obtain the mixture of plural kinds of polyaromatic hydrocarbon oxides, and such purifying step may be performed by including a step of centrifuging the resulting product from the oxidation step. By performing such purifying step, the mixture of the polyaromatic hydrocarbon oxides satisfying the above-described molecular weight distribution and the like may be obtained appropriately in a higher purity, and using the dispersant containing the mixture, carbon nanotubes may be more effectively prepared by the method of one embodiment.

Meanwhile, in the preparation method of carbon nanotubes of one embodiment, after forming and providing the dispersion, the dispersion may be continuously passed through the high pressure homogenizer having a predetermined structure, thereby pulverizing or disentangling carbon nanotube bundles contained in the dispersion, and through this, preparing carbon nanotubes having a fine size in a well-untangled state.

As described above, several methods for physically pulverizing and disentangling carbon nanotube bundles, such as wet or dry pulverizing method, or ultrasonic irradiation method, have previously been known. However, with these conventional methods, there is a limit to untangle and disentangle the tangled carbon nanotube bundles, or there are disadvantages that the effect of pulverizing the carbon nanotube bundles is not sufficient and thus the step for pulverizing or disentangling these bundles takes a long time and it is difficult to apply to mass production of carbon nanotubes.

By contrast, according to the present invention, as the high pressure homogenizer is used in the presence of a certain dispersant, the carbon nanotube bundles entangled like a skein of yarn can be more effectively disentangled, and due to excellent pulverization effect of the high pressure homogenizer, the carbon nanotubes having a more uniform and fine size can be effectively obtained within a short period of time.

FIG. 1 is an outlined schematic view showing a principle of high pressure homogenizer usable in a preparation method of carbon nanotubes of one embodiment.

Referring to FIG. 1, the high pressure homogenizer may have a structure comprising an inlet of raw materials such as carbon nanotube bundles, an outlet of pulverized or disentangled products such as carbon nanotubes, and a microchannel for connecting between the inlet and the outlet and having a diameter in micrometer scale. If a raw material in the state of dispersion is introduced, while applying high pressure, for example, about 100 to 3000 bar, or about 1000 to 2000 bar, or about 1100 to 1700 bar, through the inlet of the high pressure homogenizer, then the raw material is passed through the microchannel in micron scale (μm), for example, having a diameter of about 1 mm or less, or 50 to 800 μm, or about 75 to 200 μm, thereby accelerating the raw material speed to supersonic speed and applying a high shear force.

By the action of the shear force, carbon nanotube bundles can be pulverized into carbon nanotubes having a shorter length on the inlet side of the microchannel. As these small pulverized carbon nanotubes are applied to a strong shear force while passing through the microchannel, these nanotubes can be well untangled and disentangled. Finally, in the vicinity of the outlet, a strong turbulence is generated by a cavitation phenomenon generated when the fluid exits the wide outlet from a narrow microchannel, whereby fine carbon nanotubes pulverized and disentangled can be uniformly dispersed by a strong force. Consequently, in the outlet, the carbon nanotubes can be suitably pulverized and disentangled with the above-described dispersant in an aqueous solvent or a polar organic solvent, thereby obtaining the nanotubes in a state of uniformly dispersed dispersion.

As a result, the carbon nanotube bundles entangled like as a skein of yarn can be more efficiently pulverized and disentangled, and the carbon nanotubes having a more uniform and fine size, or a uniform dispersion thereof can be effectively obtained within a short period of time.

Within the dispersion thus obtained, the carbon nanotubes are prepared by the above-described method and the form of bundles can be completely untangled, thereby providing the carbon nanotubes in a pulverized and disentangled form. The resulting carbon nanotubes can uniformly have a fine second length of about 0.1 to 10 μm, or about 0.5 to 5 μm, or about 1 to 3 μm. The second length of these carbon nanotubes can be measured by the methods of observing and analyzing them using an electron microscope or the like similarly to the above-described first length.

Meanwhile, the above-described preparation method of carbon nanotubes of one embodiment may further comprise recovering and drying carbon nanotubes from a dispersion containing carbon nanotubes having a second length and a dispersant by passing the dispersion through a high pressure homogenizer, wherein the recovering step may proceed by a centrifugation, a vacuum filtration or a pressure filtration. Further, the drying step may proceed by vacuum-drying at a temperature of about 30 to 200° C.

As described above, as the carbon nanotubes where particles having a more uniform and fine size are well untangled and thus present in a disentangled and dispersed state are prepared by the method of one embodiment, these carbon nanotubes can be preferably used in various applications while taking advantage of their unique excellent properties.

Further, as already described above, as a dispersant, particularly a dispersant containing a mixture of polyaromatic hydrocarbon oxides is used, the carbon nanotubes finally prepared by the method of one embodiment can be formed in a state where these certain dispersant is physically attached to the surface. Due to the physical attachment of the dispersant, the carbon nanotubes can exhibit a very excellent dispersibility in various polar solvents immediately, without the need for proceeding a separate treatment or processing. That is, the conventional carbon nanotubes typically have a low dispersibility in at least a portion of the solvent. Thus, in order to utilize these carbon nanotubes, there was a need to proceed a separate treatment for improving a dispersibility or to use a separate dispersant or the like. By contrast, the carbon nanotubes prepared by the method of one embodiment of the invention can exhibit excellent dispersibility in various polar solvents immediately, without the need for a separate processing or the like.

Therefore, by re-dispersing the carbon nanotubes (especially, those where the above-described certain dispersant is physically attached) prepared by the method of one embodiment immediately (continuously) in various polar solvents, these carbon nanotubes may be used in various applications such as a conductive paste composition, a conductive ink composition, a composition for forming a heat dissipation substrate, an electrically conductive composite, a composite for EMI shielding, or a conductive material or slurry for a battery.

According to another embodiment of the invention, there is provided a dispersion composition comprising the above-described carbon nanotubes. This dispersion composition is a mixture of plural kinds of poly-aromatic hydrocarbon oxides, and it can comprise a carbon nanotube wherein a dispersant including a mixture containing polyaromatic hydrocarbon oxides having a molecular weight of 300 to 1000 in an amount of 60% by weight or more is physically attached to the surface; and a polar solvent for dissolving or dispersing the carbon nanotubes.

As already described above, the dispersion composition can be prepared by forming a carbon nanotube having a second length wherein the dispersant is physically attached to the surface through the above-described preparation method, and then dissolving or dispersing the carbon nanotube in a polar solvent, without separate processing for improving the dispersibility thereof. Herein, the second length that the carbon nanotube has already been described above, and thus additional description thereof will be omitted.

When using this dispersion composition, a thin carbon nanotube film can be prepared through a method such as vacuum filtration. Despite the use of the dispersant, the carbon nanotube film or the like can exhibit low sheet resistance of about 72Ω/□ or less and excellent electrical properties. In addition, when using the dispersion composition, even without any special separate processing or a processing for re-dispersion, carbon nanotubes are put into a conductive material or slurry for a battery immediately and allow the preparation of electrodes in the uniformly dispersed form. Therefore, the dispersion composition can be very preferably used in various applications and in the preparation of products, such as a conductive paste composition, a conductive ink composition, a composition for forming a heat dissipation substrate, an electrically conductive composite, a composite for EMI shielding, or a conductive material or slurry for a battery.

In the dispersion composition, as the polar solvent for dispersing the carbon nanotubes, an aqueous solvent such as water, or any polar solvent may be applied without particular limitation. As a specific example of the polar solvent, one or more selected from the group consisting of water, NMP, acetone, DMF, DMSO, ethanol, isopropyl alcohol, methanol, butanol, 2-ethoxy ethanol, 2-butoxy ethanol, 2-methoxy propanol, THF, ethylene glycol, pyridine, dimethylacetamide, N-vinyl pyrrolidone, methyl ethyl ketone, butanone, α-terpinol, formic acid, ethyl acetate and acrylonitrile, may be used.

Further, in the dispersion composition, carbon nanotubes wherein the dispersant is physically attached to the surface may be included in an amount of about 50 parts by weight or less, or about 30 parts by weight or less, based on 100 parts by weight of a polar solvent. Even if the carbon nanotubes are contained in a high concentration of these ranges, it is possible to maintain a uniformly dispersed state in the polar solvent.

Thus, in the dispersion composition, by the action of a certain dispersant physically attached to a carbon nanotube, the carbon nanotube can exhibit excellent dispersibility per se in various polar solvents. Therefore, in consideration of the actually applied use, the dispersion composition can maintain a state of being uniformly dispersing the carbon nanotubes in a high concentration in various polar solvents. Thus, such a dispersion composition can maximize and express excellent characteristics of carbon nanotubes, and it can be applied in various uses where the application thereof is needed.

More specifically, the dispersion composition of carbon nanotubes can be used as a conductive paste composition, a conductive ink composition, a composition for forming a heat dissipation substrate, an electrically conductive composite, a composite for EMI shielding, or a conductive material or slurry for a battery, and besides, may be used in any field of use where it has been known that the application of carbon nanotubes in a state of dispersion liquid is possible or needed.

Hereinafter, the action and effect of the invention will be described in detail, through specific examples of the invention. However, the examples are provided only to illustrate the present invention, and the scope of the invention is in no way determined thereby.

Preparation Example 1: Preparation of Dispersant

Pitch which is a petroleum byproduct available from POSCO underwent an oxidation process and a refining process as follows, thereby preparing the dispersant of Preparation Example 1.

First, 0.5 to 1.5 g of pitch was added to 75 ml of a mixed solution of sulfuric acid/nitric acid (volume ratio 3:1), and an oxidation reaction proceeded at 70° C. for about 3.5 hours.

Subsequently, a pitch reaction solution in which the oxidation reaction proceeded, was cooled to room temperature, and diluted with distilled water to an about 5-fold solution, and then centrifuged at about 3500 rpm for 30 minutes. Then, supernatant was removed, the same amount of distilled water was added to the solution which was then re-dispersed, and thereafter, centrifugation was performed again under the same condition to finally collect and dry precipitate. Through this process, the dispersant of Preparation Example 1 was prepared.

First, the molecular weight distribution of the pitch used as a raw material in the preparation process of the dispersant was analyzed by a MALDI-TOF mass spectrum, and the results are shown in FIGS. 2a and 2b (enlarged views in the range of molecular weight of 400 to 500); and the molecular weight distribution of the dispersant of Preparation Example 1 was analyzed similarly, and the results are shown in FIGS. 3a and 3b (enlarged views in the range of molecular weight of 400 to 500). The analysis was carried out by adding the pitch or the dispersant to a matrix, mixing them, and then drying the mixture, using a MALDI-TOF mass spectrum equipment (Ultraflex II, Bruker).

Referring to FIGS. 2a and 2b (enlarged views), it was confirmed that the pitch includes polyaromatic hydrocarbons having a molecular weight of 200 to 1500, and especially, from the detection of large peaks in an interval of a molecular weight of 14 Da in an enlarged view of FIG. 2b, plural kinds of polyaromatic hydrocarbons having a different number of aromatic rings (benzene rings) from each other are linked by aliphatic hydrocarbons. By contrast, referring to FIGS. 3a and 3b (enlarged views), it was confirmed that in case of the dispersant of Preparation Example 1, large peaks existing in an interval of 44 Da and 16D, respectively, in the polyaromatic hydrocarbons are observed, which proves the presence of the mixture of the polyaromatic hydrocarbon oxides in which an oxygen-containing functional group such as —COOH, —OH or —SO$_3$H is introduced in the aromatic hydrocarbons, wherein the oxides having a molecular weight of about 300 to 1000, or 300 to 700 are contained in 60% by weight or more.

Further, the pitch used as the raw material (upper) and the pitch of Preparation Example 1 (lower) were analyzed by a 13C CPMAS NMR (Varian 400 MHz Solid-State NMR), respectively, and the analysis results are shown in FIG. 4 by comparison. Referring to FIG. 4, a carbon-derived peak of the aromatic hydrocarbons, and a carbon-derived peak of some aliphatic hydrocarbons were confirmed in the pitch, but the presence of the oxygen-containing functional group was not confirmed. By contrast, as a result of NMR analysis of the dispersant of Preparation Example 1, a peak of the oxygen-containing functional group was confirmed. The kind of the oxygen-containing functional group was confirmed to be an epoxy group, a hydroxy group, a carboxy group, or the like.

In addition, the pitch used as the raw material and the dispersant of Preparation Example 1 were analyzed by FT-IR (Agilent 660-IR) in a powder state, respectively, and the analysis results are shown in FIG. 5 by comparison. Through FIG. 5 also, it was confirmed that the peak of the oxygen-containing functional group was produced in the dispersant of Preparation Example 1.

Preparation Examples 2 to 4: Preparation of Dispersant

The dispersants of Preparation Examples 2 to 4 were prepared, respectively, in the same manner as in Preparation Example 1, except that pitch which is a petroleum byproduct available from POSCO (however, the pitch was from a different sample from that of Preparation Example 1) was used, and the oxidation reaction time was 1 hour (Preparation Example 2), 3.5 hours (Preparation Example 3), and 7 hours, respectively.

The dispersants were analyzed in the same manner as Preparation Example 1 by a MALDI-TOF mass spectrum, and the results are shown together in FIG. 6 by comparison. Referring to FIG. 6, it was confirmed that as the oxidation time increases, the content of the components having a molecular weight of more than about 1000, or more than about 700 (polyaromatic hydrocarbon oxides) in the dispersant is reduced, and thus, the dispersant in the form of a mixture containing the polyaromatic hydrocarbon oxides having a molecular weight of about 300 to 1000, or about 300 to 700 in a higher content, was obtained.

Experimental Example 1: Measurement of Oxygen Content of Dispersant

About 1 mg of the dispersant samples obtained in Preparation Examples 3 and 4 were heated to a high temperature of nearby about 900° C. on a thin foil. At this time, as the foil is instantaneously melted, the temperature was raised to about 1500 to 1800° C., and by such high temperature, gas was generated from the sample. The gas was collected and subjected to elemental analysis to measure and analyze the content of each element of carbon, oxygen, hydrogen and nitrogen. The results of this analysis are shown in Table 1 below, as compared with the analysis results of the pitch used for preparation of each dispersant.

TABLE 1

| Sample name | C (wt %) | H (wt %) | N (wt %) | O (wt %) |
|---|---|---|---|---|
| Pitch | 95.5 | 4.5 | — | — |
| Preparation Example 3 | 40.0 | 1.8 | 7.6 | 38.0 |
| Preparation Example 4 | 40.0 | 1.5 | 7.8 | 39.2 |

Referring to Table 1, it was confirmed that the oxygen content was about 12 to 50% by weight, or about 30 to 40% by weight in the dispersant of Preparation Examples 3 and 4, based on the total element content, when analyzing the content of each element.

Example 1: Preparation of Carbon Nanotube

First, a carbon nanotube bundle used as a raw material was synthesized by a CVD method, and electron micrographs thereof are as shown in (a) and (b) of FIG. 7. Referring to (a) and (b) of FIG. 7, it was confirmed that the carbon nanotube bundle has a particle size of about 500 μm or more (the actual length was confirmed to be much larger than this) and that a long carbon nanotube bundle was entangled like a skein of yarn.

10.0 g of carbon nanotube bundles was added to 3 L of aqueous dispersion where 0.3 g of the dispersant of Preparation Example 1 is dispersed, thereby forming a dispersion. The dispersion was introduced to the inlet of the high pressure homogenizer at high pressure of about 1,600 bar to be passed through a microchannel, and this process was repeated 10 times. Through this, the carbon nanotube bundle was pulverized and disentangled, and thus the carbon nanotube of Example 1 was prepared.

An electron micrograph of the carbon nanotube is as shown in (f) of FIG. 7. Referring to (f) of FIG. 7, it was confirmed that the uniform and fine carbon nanotubes having a length of about 0.5 to 5 μm are well disentangled and thus present in a uniformly dispersed state. For reference, the length of the carbon nanotubes was calculated by observing and analyzing the respective carbon nanotubes based on the electron micrographs.

Examples 2 to 4: Preparation of Carbon Nanotube

The carbon nanotubes of Examples 2 to 4 were prepared by pulverizing and disentangling the carbon nanotube bundles in the same manner as in Example 1, except that the dispersants of Preparation Examples 2 to 4 were used instead of the dispersant of Preparation Example 1, respectively.

The carbon nanotubes thus obtained were observed and analyzed through the electron micrographs. As a result, it was confirmed that, even in the case of Examples 2 to 4, the uniform and fine carbon nanotubes having a length of about 0.5 to 5 μm are well-disentangled and thus present in a uniformly dispersed state.

Comparative Examples 1 and 2: Preparation of Carbon Nanotube

The carbon nanotube bundle used in Example 1 was similarly used as a raw material, but 2.5 g of the carbon nanotube bundle was subjected ten times to a ball milling (Comparative Example 1) or a jet milling (Comparative example 2) under dry conditions to produce the carbon nanotubes of Comparative examples 1 and 2, respectively. Electron micrographs of these carbon nanotubes are as shown in (c) and (d) of FIG. 7, respectively. Referring to (c) and (d) of FIG. 7, it was confirmed that the carbon nanotubes having a length of up to several tens of μm were produced, but these carbon nanotubes were not well disentangled and thus present in a state of being still tangled like a skein of yarn.

Comparative Example 3: Preparation of Carbon Nanotube

The dispersion of the carbon nanotube bundle was formed with the same method and composition as in Example 1 and then subjected ten times to a ball milling to produce the carbon nanotube of Comparative example 3.

Electron micrograph of the carbon nanotube is as shown in (e) of FIG. 7. Referring to (e) of FIG. 7, it was confirmed that the carbon nanotube having a length of 10 μm or less was produced by pulverization, but this carbon nanotube was not well disentangled and thus present in a state of being still tangled like a skein of yarn. Therefore, it was confirmed that in order to well disentangle the carbon nanotubes and untangle an entangled form, an additional ultrasonic irradiation process is needed.

Comparative Example 4: Preparation of Carbon Nanotube

The dispersion of the carbon nanotube bundle was formed with the same method and composition as in Example 1, except that the dispersant of Preparation Example 1 was used. Then, the dispersant was passed through the high pressure homogenizer in the same manner as in Example 1 to produce the carbon nanotube of Comparative example 4.

Electron micrograph of the carbon nanotubes is as shown in FIG. 8. Referring to FIG. 8, it was confirmed that the carbon nanotubes having a length of 10 μm or less was produced by pulverization, but these carbon nanotubes were not well disentangled and thus present in a state of being still tangled like a skein of yarn.

Experimental Example 2: Evaluation of Redispersibility for a Polar Solvent of Carbon Nanotube The dispersion containing the carbon nanotube of Example 1 and the dispersant of Preparation Example 1 was prepared and then centrifuged at 8000 rpm for 30 minutes to thereby recover a carbon nanotube as a precipitate. Subsequently, the recovered carbon nanotube was dried under vacuum in a 55° oven for three days to obtain a desired carbon nanotube in a dried state.

The carbon nanotube powder was added in a concentration of 0.5 mg/ml to various solvents shown in FIG. 9 and then re-dispersed by a bath type sonicator for 30 minutes. The photographs of the observation with the naked eye illustrating the evaluation results of the redispersibility are shown in FIG. 9.

Referring to FIG. 9, it was confirmed that the carbon nanotubes obtained in Examples could be very uniformly dispersed in a high concentration in various polar solvents. This is predicted to be due to the action of the dispersant of Preparation Example 1 used in Examples. In particular, it was confirmed that the carbon nanotubes prepared by a conventional method were again aggregated in a polar solvent and thus it was difficult to be dispersed therein without additional processing, however, the carbon nanotubes of Examples could be uniformly dispersed in various polar solvents and thus it could be easily applied to more various uses.

Experimental Example 3: Preparation of Carbon Nanotube-Containing Film and Evaluation of its Electrical Properties (Measurement of Sheet Resistance)

First, the carbon nanotube was recovered and dried in the same manner as in Experimental Example 2 from the dispersion of carbon nanotubes obtained in Example 1. This carbon nanotube powder was re-dispersed in various concentrations of 0.05, 0.1, 0.2 and 0.5 mg/ml in water to form an aqueous dispersion. 20 ml of the aqueous dispersion was vacuum-filtered using a porous AAO membrane having a diameter of 47 mm and a pore size of 200 nm to produce a carbon nanotube-containing film. The sheet resistance of the carbon nanotube-containing film was measured using a 4-point probe apparatus, and the measurement results are shown in FIG. 10.

Referring to FIG. 10, it was confirmed that as the concentration of carbon nanotubes in the aqueous dispersion increases, the conductive network between the carbon nanotubes is developed in the film and the uniformity of the film increases, thereby exhibiting lower, but uniform, sheet resistance. In addition, it was confirmed that the carbon nanotube-containing film had low sheet resistance and excellent electric conductivity as a whole. From this, it was confirmed that the dispersant physically attached to the surface of the carbon nanotube did not have an adverse effect on the electrical conductivity of the carbon nanotube.

Experimental Example 4: Preparation of Carbon Nanotube-Containing Conductive Material and Electrode, and Evaluation of the Dispersibility Thereof First, the carbon nanotube was recovered and dried in the same manner as in Experimental Example 2 from the dispersion of carbon nanotube obtained in Example 1. The carbon nanotube powder, and MAG graphite (hereinafter, "MAG") as an active material used in the negative electrode material for battery, were mixed in a weight ratio of MAG: carbon nanotube=about 80:1, to which a small amount of water was added to adjust the viscosity, thereby producing a paste composition. This paste composition was bar-coated on the copper foil.

The paste composition was prepared in the same manner as described above using the carbon nanotube powders of Comparative Examples 1 to 3 and then bar-coated on a copper foil.

The photograph of the surface of the negative electrode for battery thus obtained was observed with an electron microscope and shown in FIG. 11, respectively. For reference, (a) and (b) of FIG. 11 are electron micrographs of the surface of the negative electrode produced using the carbon nanotube obtained in Comparative Example 1; (c) and (d) of FIG. 11 are electron micrographs of the surface of the negative electrode produced using the carbon nanotube obtained in Comparative Example 2; (e) and (f) of FIG. 11 are electron micrographs of the surface of the negative electrode produced using the carbon nanotube obtained in Comparative Example 3; and (g) and (h) of FIG. 11 are electron micrographs of the surface of the negative electrode produced using the carbon nanotube obtained in Example 1.

Referring to FIG. 11, it was confirmed that, when using the carbon nanotube obtained in Example 1, the carbon nanotubes were most uniformly dispersed on the surface of the negative electrode. By contrast, it was confirmed that, when using the carbon nanotubes of Comparative Examples 1 to 3, the carbon nanotube bundle entangled like a skein of yarn was present separately from the active material, or the carbon nanotubes considerably aggregated was present on the surface of the negative electrode.

Experimental Example 5: Evaluation of Battery Properties

A negative electrode active material (MAG graphite), a carbon nanotube or carbon black-containing conductive material, a thickener (CMC) and a binder polymer (SBR) were mixed to produce a composition for negative electrode formation. In this case, as the conductive material, (1) the carbon black-containing conductive material prepared in Example 1, (2) the carbon black-containing conductive material (manufactured by TIMCAL Graphite & Carbon, Super P-containing material), and (3) the carbon nanotube-containing conductive material prepared in Comparative Example 3 were used, respectively.

The negative electrode active material (MAG graphite), the carbon nanotube or carbon black-containing conductive material, the thickener (CMC) and the binder polymer were mixed in an amount of 96.8 parts by weight, 1 part by weight, 1.2 parts by weight and 1 part by weight, respectively, based on 100 parts by weight of the composition for negative electrode formation to prepare a slurry composition for negative electrode formation.

The slurry composition for negative electrode formation was coated at a constant thickness on a copper current collector, dried, rolled and then punched to the required size to prepare a negative electrode. Using the negative electrode, coin-type half cells of a positive electrode and a lithium secondary battery containing it were fabricated by a conventional method, respectively. For the evaluation of the properties of the lithium secondary battery, the capacity retention of the cells that used different conductive materials from each other was measured to confirm the performance of the conductive material.

The results of the measurement of the capacity retention of these cells were shown in FIG. 12. In FIG. 12, (1) shows the used result of the carbon nanotube-containing conductive material prepared in Example 1, (2) shows the used results of the carbon black-containing conductive material, and (3) shows the used results of the carbon nanotube-containing conductive material prepared in Comparative Example 3.

Referring to FIG. 12, it was confirmed that, when using the carbon nanotube-containing conductive material prepared in Example 1, it exhibited a very high capacity retention of about 97.8% after 50 cycles. However, when using the carbon nanotube-containing conductive material of Comparative Example 3 or the carbon black-containing conductive material, it exhibited a capacity retention of about 95.1%, which showed inferior capacity retention and cycle life characteristics as compared to Examples. It appears that this is because the carbon nanotube had excellent characteristics per se and the carbon nanotube of Example 1 was well disentangled and thus present in a uniformly dispersed state.

The invention claimed is:

1. A method for preparing carbon nanotubes, comprising:

oxidizing a fossil fuel byproduct containing plural kinds of polyaromatic hydrocarbons to prepare a dispersant, wherein the dispersant is a mixture of plural kinds of polyaromatic hydrocarbon oxides, wherein polyaromatic hydrocarbon oxides having a molecular weight of 300 to 1000 are present in the mixture in an amount of 60% by weight or more, wherein the polyaromatic hydrocarbon oxides have a structure in which one or more oxygen-containing functional groups are bonded to a polyaromatic hydrocarbon consisting of 5 to 30 fused benzene rings, and wherein the dispersant has an oxygen content of 12 to 50% by weight based on a total element content in the mixture; and passing a dispersion through a high pressure homogenizer, wherein the dispersion is passed through the high pressure homogenizer for more than one pass, wherein the high pressure homogenizer comprises an inlet, an outlet, and a microchannel connecting the inlet and the outlet, the microchannel having a micrometer scale diameter, wherein the dispersion comprises carbon nanotube bundles having a first length, the dispersant, and a solvent,
   and
   wherein the carbon nanotube bundles having the first length are pulverized or disentangled while passing through the microchannel under the application of a shear force to form carbon nanotubes having a second length shorter than the first length.

2. The method for preparing carbon nanotubes according to claim 1, wherein the first length is 20 μm or more.

3. The method for preparing carbon nanotubes according to claim 1, wherein the second length ranges from about 0.1 to 10 μm.

4. The method for preparing carbon nanotubes according to claim 1, wherein, in the dispersion, the carbon nanotube bundles and the dispersant are dissolved or dispersed in the solvent, wherein the solvent is an aqueous solvent or a polar organic solvent.

5. The method for preparing carbon nanotubes according to claim 1, wherein the dispersant has an oxygen content of 30 to 40% by weight based on the total element content in the mixture.

6. The method for preparing carbon nanotubes according to claim 1, wherein the polyaromatic hydrocarbon consists of 7 to 20 fused benzene rings.

7. The method for preparing carbon nanotubes according to claim 1, wherein the microchannel has a diameter of 50 to 800 μm.

8. The method for preparing carbon nanotubes according to claim 1, wherein the dispersion is introduced in the inlet of the high pressure homogenizer under application of pressure of 100 to 3000 bar and passed through the microchannel.

9. The method for preparing carbon nanotubes according to claim 1, further comprising:

recovering and drying carbon nanotubes having the second length from the dispersion passed through the high pressure homogenizer.

10. The method for preparing carbon nanotubes according to claim 9, wherein the recovering of the carbon nanotubes includes centrifuging, vacuum filtering or pressure filtering the dispersion after the dispersion has passed through the high pressure homogenizer.

11. The method of claim 1, wherein polyaromatic hydrocarbon oxides having a molecular weight of 300 to 700 are present in the mixture in an amount of 70% to 95% by weight, and wherein the dispersant has an oxygen content of 30 to 50% by weight based on a total element content in the mixture.

12. The method of claim 1, wherein the fossil fuel byproduct is pitch.

* * * * *